United States Patent

[11] 3,579,843

[72] Inventor Edward Peonski
  West Dundee, Ill.
[21] Appl. No. 814,405
[22] Filed Apr. 8, 1969
[45] Patented May 25, 1971
[73] Assignee American Gage & Machinery Company
  Elgin, Ill.

[54] GAGE WITH VARIABLE RESPONSE AMPLIFIER
  8 Claims, 4 Drawing Figs.
[52] U.S. Cl. ................................. 33/147,
  324/115
[51] Int. Cl. ................................. G01b 5/00,
  G01r 15/08
[50] Field of Search ......................... 324/115,
  103, 103 (P); 33/143 (L), 147 (L), 147 (N), 174
  (L), 178 (E), 172 (E)

[56] References Cited
UNITED STATES PATENTS
2,708,736  5/1955  Creveling et al. ............  324/103
2,997,651  8/1961  Richeson, Jr. et al. .........  324/103
3,458,812  7/1969  Krussmann et al. ...........  324/103X Primary Examiner—Rudolph V. Rollinec
Assistant Examiner—Ernest F. Karlsen
Attorney—Gary, Parker, Juettner, Pigott and Cullinan ABSTRACT: An improved gage in combination with an amplifier which will respond more rapidly to a change of signal in one direction than to a change of signal in the opposite direction and where the ratio of the response rate in one direction to the response rate in the other direction is adjustable.

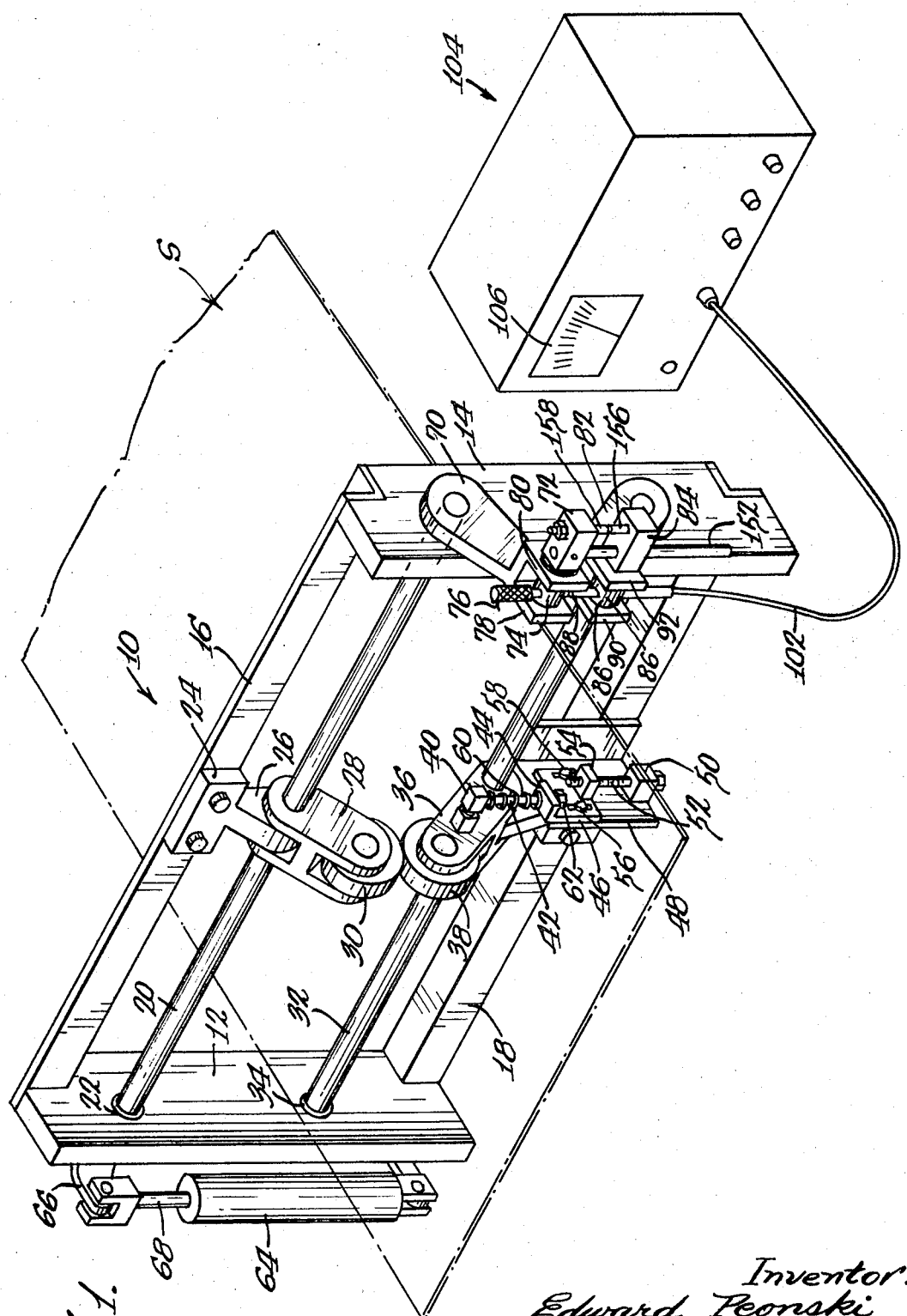

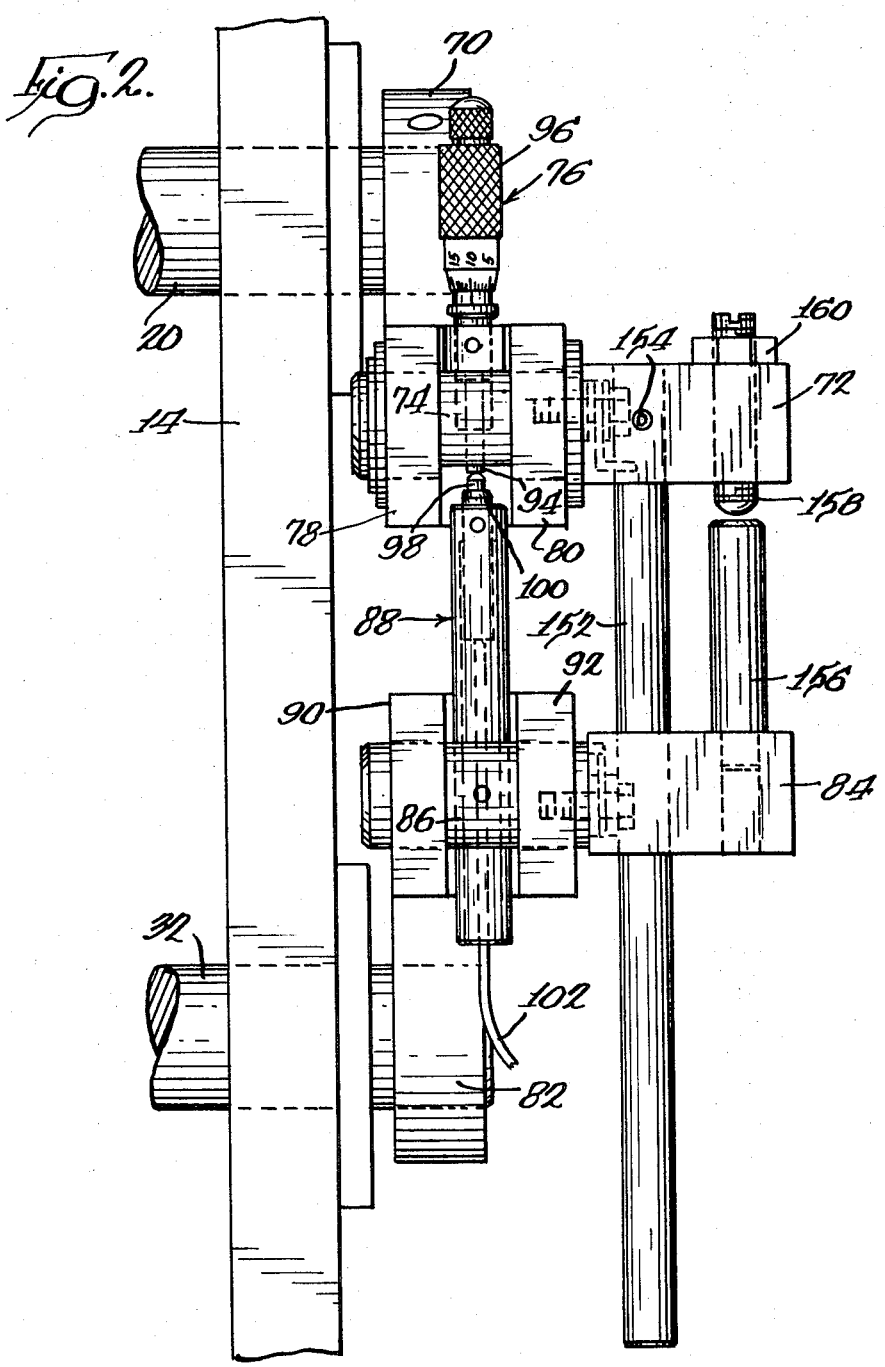

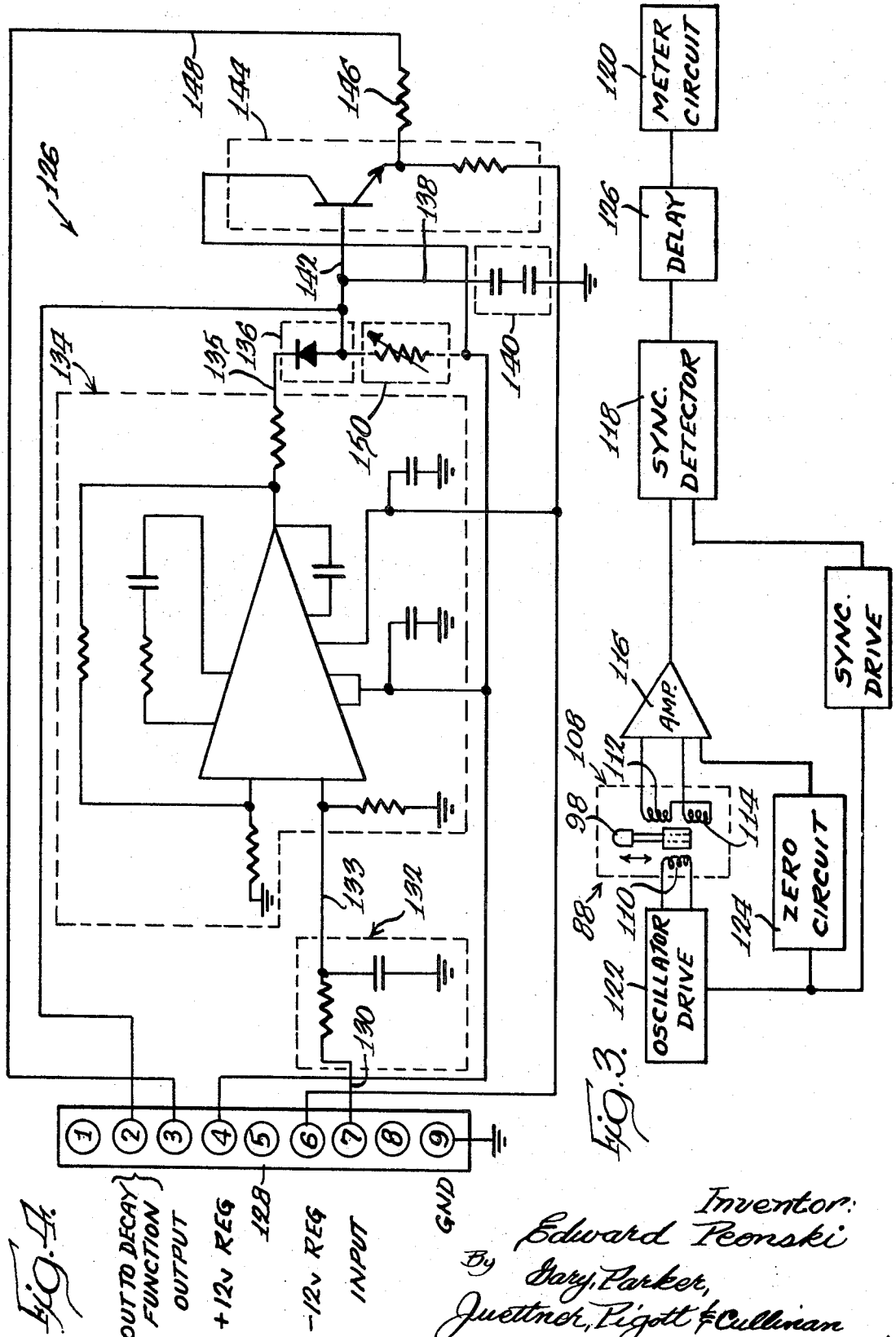

GAGE WITH VARIABLE RESPONSE AMPLIFIER

BRIEF SUMMARY OF THE INVENTION

It is known in the art to measure the thickness or other dimensions of a part by using a gage head in combination with a comparator amplifier in such a manner that a movable element of the gage head is positioned in accordance with the dimension of the part to be checked and a reading is produced on the associated amplifier which reading is determined in accordance with the position of the movable gage element.

For example, it is known in such a gage system to use a linear variable differential transformer where the coupling between the primary and secondary windings of the transformer can be changed by varying the position of an iron-alloy core that magnetically links the primary and secondary windings. The movement of the core will then produce an output at the secondary which varies with the position of the core. The core may be mounted through linkages to a gage tip or other mechanical sensing member that travels over the work. In this manner, the gage head may be used to produce a DC voltage which is proportional to the linear displacement of the core and thus proportional to the dimension of the work, and such voltage may be applied to a DC meter which is properly calibrated to indicate the dimension of the part.

One significant limitation with a known gage system of the foregoing type is that the device is sensitive to any changes in the position of the gage tip and is incapable of evaluating whether or not such a position change has been caused by a true change in the dimension of the part or whether it has been caused by other factors. By way of example, where a gage is utilized to measure the thickness of moving metal sheet stock, and where the gage head includes a movable element the position of which is controlled by the spacing between a pair of rollers which engage against opposite sides of the sheet stock, false high readings of thickness will often be produced due to bouncing or weaving of the sheet stock. Similarly, any substantial vibration of the sheet stock will produce false high readings of thickness of the DC meter which is connected to the gage head. Another frequent cause of false high readings is due to dirt or contamination on the material being gaged, inasmuch as known gage devices are generally incapable of distinguishing between a true increase in the dimension of the work and an apparent increase in such dimension caused by contamination of the work.

Certain known gage devices have been designed so as to produce an average reading based on the high and low dimensions which are sensed by the gaging device. However, while such a device will in effect produce a relatively steady reading by averaging out the highs and lows, yet the resultant average reading which is produced is significantly influenced by the factors discussed above such as bounce, weaving, vibration and contamination of the work, and thus such readings are still significantly inaccurate for the reason that they are affected by factors other than the true dimension of the work.

It is a general object of the present invention to provide an improved gaging device which avoids the foregoing problems and provides accurate readings of the dimension of the work by in effect ignoring false readings caused by factors other than a change in the true dimension of the work.

A more specific object of my invention is to provide a gage device including a gage head in combination with a variable response amplifier which affords a relatively rapid response to a signal change in one direction and a relatively slow response to a signal change in the opposite direction, whereby apparent changes in the dimension of a part in a selected direction such as an apparent increase in the dimension of a part will be ignored unless the increase occurs gradually or is maintained over a period of time so as to indicate an actual change in the true dimension of the work in accordance with a change in the process of producing the same.

A further one of my objects is to provide a gage device as last above mentioned which includes means for varying the ratio of the response rate in one direction to the response rate in the other direction for purposes of adjusting such ratio in accordance with the rate of dimensional change of the work in a given manufacturing process.

The foregoing and other objects and advantages of the invention will be apparent from the following description of a preferred embodiment thereof, taken in conjunction with the accompanying drawings.

DESCRIPTION OF THE DRAWINGS

FIG. 1 is a perspective view of a stock gage fixture for use in gaging the thickness of sheet stock, such fixture being one example of the manner in which a gage device may be used in combination with a variable response amplifier in accordance with the present invention;

FIG. 2 is an enlarged fragmentary front elevational view of the stock gage fixture of FIG. 1 showing in particular a gage head for connection with a variable response amplifier in accordance with the present invention;

FIG. 3 is a block diagram showing a delay circuit in accordance with the present invention added to a conventional amplifier circuit; and FIG. 4 is a schematic wiring diagram showing the delay circuit of FIG. 3.

Now, in order to acquaint those skilled in the art with the manner of making and using my invention, I shall describe, in conjunction with the accompanying drawings, a preferred embodiment of the invention.

DETAILED DESCRIPTION OF THE INVENTION

Referring now to the drawings, FIG. 1 shows a strip stock gage fixture 10 comprising a pair of side frame walls 12 and 14 interconnected by horizontal beam members 16 and 18. An upper shaft 20 extends horizontally between the sidewalls 12 and 14 and has its ends journaled in bearings mounted in the sidewalls such as shown at 22 so as to be rotatable about its longitudinal axis. A central support bracket 24 is bolted to the horizontal beam 16 and includes a lug 26 which is apertured so as to permit the rod 20 to pass therethrough. A roller support bracket 28 is fixedly mounted on the shaft 20 for rotation therewith, and the bracket 28 carries at its lower end a rotatable crowned roller 30 for engagement with the upper surface of a moving strip of sheet stock S, as will be described more fully later herein. There is also provided a lower shaft 32 which extends horizontally between the sidewalls 12 and 14 and has its ends journaled in bearings mounted in the sidewalls such as shown at 34. A roller support bracket 36 is fixedly mounted on the shaft 32 for rotation therewith, and the bracket 36 carries at its upper end a rotatable crowned roller 38 for engagement with the underside of the moving strip of sheet stock S.

It will be understood from the foregoing that the sheet stock S passes between the rollers 30 and 38, and the rollers bear against the upper and lower surfaces of the sheet stock in such a manner that the thickness of the sheet stock S determines the spacing between the rollers. The lower roller support bracket 36 has a small block 40 secured thereto, and a threaded rod 42 is rigidly affixed to the block 40 and extends downwardly therefrom so as to project through an aperture in a horizontal flange 44 which forms an integral part of a slide bracket 46. The block 40 is pivotally mounted relative to the roller support bracket 36 so as to permit pivotal movement of the rod 42 relative thereto.

The slide bracket 46 is vertically adjustable in relation to a mounting plate 48 which is fixedly mounted to the horizontal crossbeam 18. The mounting plate 48 has fixedly secured thereto a block 50 through which a threaded adjusting screw 52 projects. The screw 52 is disposed vertically and its upper end is threaded through a block or nut 54 which is affixed to the vertically adjustable slide bracket 46. The slide bracket 46 is connected to the fixed mounting plate 48 by means of a pair of bolts 56 and 58 which extend through corresponding vertical slots in the slide bracket 46 so as to permit vertical adjustment of the latter.

It will be understood from the foregoing that rotation of the screw 52 will afford adjustment of the vertical position of the bracket 46. It will also be noted that a compression spring 60 is mounted on the vertical rod 42 so as to extend between the block 40 and the horizontal flange 44. A nut 62 is threaded on the lower end of the rod 42 beneath the flange 44, and it will be seen that through advancement of the nut 62 on the rod 42 the latter will be drawn downwardly thereby causing the roller support bracket 36 to be pulled downwardly in a pivotal motion about the axis of the shaft 32.

The foregoing downward adjustment of the roller 38 will further compress the spring 60 which biases the roller support bracket 36 upwardly to a limiting position as determined by the rod 42 and nut 62. It will therefore be seen that the crowned roller 38 is generally disposed approximately at the upper limit of its travel and that it is capable of downward movement in a pivotal manner about the axis of the shaft 32 if a force is applied thereto sufficient to compress the spring 60. The force of the spring 60 as well as the position of the roller 38 is adjustable by means of the nut 62, whereas adjustment only of the position of the roller 38 may be effected through rotation of the screw 52.

The upper crowned roller 30 is biased downwardly toward the lower roller 38 by means of an air cylinder 64, the lower end of which is connected to the side frame wall 12 and the upper end of which is connected to a crank arm 66 which is fixedly mounted on the upper shaft 20 for rotation therewith. Accordingly, air is supplied to the cylinder 64 so as to urge the piston rod 68 downwardly thereby biasing the roller 30 in a downward direction while permitting the same to be displaced upwardly if a relatively small force is applied thereto.

As explained hereinabove, the foregoing arrangement provides for engagement of the crowned rollers 30 and 38 against the opposite surfaces of sheet stock S which is passed therebetween, and the spacing of the rollers from one another is thus determined by the thickness of the sheet stock. Still referring to FIG. 1, it will be seen that an arm 70 is mounted at the extreme right-hand end of the upper shaft 20 for rotation therewith. The arm 70 carries a swivel block 72 which in turn carries a cylindrical member 74 on which is mounted a micrometer anvil 76. The cylindrical member 74 is disposed intermediate a pair of flanges 78 and 80 formed on the arm 70. In a similar manner, an arm 82 is mounted at the extreme right-hand end of the lower shaft 32 for rotation therewith. The arm 82 carries a swivel block 84 which in turn carries a cylindrical member 86 in which is mounted a gage head 88, the latter being disposed between a pair of flanges 90 and 92 formed on the arm 82.

It will now be understood with reference to FIGS. 1 and 2 that the spacing between the crowned rollers 30 and 38 will control the spacing between the micrometer anvil 76 carried by the arm 70 and the gage head 88 carried by the arm 82. In the particular embodiment being described, the anvil 76 comprises a conventional micrometer having an anvil member 94 at its lower end (see FIG. 2) which is vertically adjustable through rotation of the knurled knob 96 at the upper end thereof. As shown in FIG. 2, the gage head 88 comprises a conventional gage head having a plunger 98 at its upper end which projects out of a housing 100 and is spring biased upwardly into engagement with the lower end of the anvil 94. Accordingly, the amount by which the plunger 98 projects out of the gage head housing 100 depends upon the spacing of the crowned rollers 30 and 38, which in turn is governed by the thickness of the sheet stock S as it moves between the rollers.

As shown in FIG. 1, the gage head 88 is connected by means of a cable 102 to an amplifier 104 including a meter 106, the reading on the meter being a measurement of the thickness of the sheet stock S. FIG. 3 shows a block diagram of the circuit for the amplifier 104, such circuit being conventional except for the addition of a delay circuit in accordance with the principles of the present invention.

As is known in the art, the gage head 88 includes a linear variable differential transformer as shown at 108 in FIG. 3. The coupling between a primary winding 110 and secondary windings 112 and 114 of the transformer can be changed by varying the position of the iron-alloy plunger or core 98 which magnetically links the primary and secondary windings. The movement of the core 98 produces an output at the secondary which varies with the position of the core. The two secondary windings 112 and 114 are wired in opposition to one another so that when the core 98 links both secondary coils 112 and 114 equally the voltages will oppose each other and the gage head will produce a zero output.

Since the secondary coils 112 and 114 are wired in phase opposition, the output is either positive or negative when the core 98 is on either side of the zero position. Thus, readings to the right or left of zero are possible on the meter 106. Because the output of the transformer 108 is small, an amplifier 116 is utilized to boost the signals to useful levels. After the signal is amplified, phase detection is accomplished with a synchronous detector 118 and, in a conventional device, the signal is then transmitted to a meter circuit 120. Excitation or driving voltage for the transformer 108 is provided by an oscillator 122 which is connected to the primary winding 110, and a zero control circuit 124 is provided so that zero DC voltage output can be set to correspond to a given displacement reference position of the plunger 98.

It will be understood from the foregoing that the gage head 88 may be positioned so that it follows the work to be gaged, or it may be used in conjunction with other sensing members such as the crowned rollers 30 and 38 of FIG. 1 which follow the work. In any such application, whether or not the plunger 98 directly engages the work, the position of the plunger is a measure of the dimension of the work, and by means of the circuit shown in FIG. 3, the plunger position can be reflected on a meter such as shown at 106 in FIG. 1.

In accordance with one embodiment of the present invention a delay circuit 126 is interposed in the amplifier circuit between the synchronous detector 118 and the meter circuit 120 as shown in FIG. 3. It should be recognized that without the delay circuit 126 the system shown in FIG. 1 will function in such a manner that the meter reading on the meter 106 will be responsive to any change in the spacing between the crowned rollers 30 and 38, and that such response will be equally rapid regardless of the direction of the change, that is, regardless of whether the spacing of the rollers is increased or decreased. Thus, referring by way of example to a gage fixture for gaging sheet stock as shown in FIG. 1, various factors such as bouncing or weaving of the sheet S, vibration, and also the presence of dirt or contamination on the sheet will temporarily affect the spacing of the rollers 30 and 38, and the device will be responsive thereto and will produce false high readings of the thickness of the sheet S. Moreover, even if more sophisticated equipment were utilized to produce an average thickness reading, the average reading would still be influenced by the various factors discussed above and thus would be inaccurate.

The delay circuit 126 which is added to the amplifier circuit of FIG. 3 in accordance with the present invention affords an improved gage system which eliminates the foregoing problems and inaccuracies. The delay circuit is illustrated in FIG. 4 which shows a connector board 128 having an input terminal indicated as "7" where the voltage signal is received from the conventional amplifier circuit, e.g., from the synchronous detector 118 of FIG. 3, there being an input lead 130 connected to the terminal "7." There is also shown an output terminal indicated at "3" where an output signal from the delay circuit 126 is supplied to the meter circuit as shown at 120 in FIG. 3. Additional terminals "4" and "6" and the ground terminal "9" represent the voltage supplies for the delay circuit.

Still referring to FIG. 4, the input voltage signal to the delay circuit is conducted over the lead 130 to an input filter 132 so that electrical noise and the like will be suppressed. Thereafter, the DC signal is supplied over a lead 133 to an operational amplifier 134 which produces sufficient amplification to provide the correct dynamic level of the following circuitry. The DC signal is then transmitted over a lead 135 to a diode 136 which in turn is connected over a lead 138 to a capacitor 140 whereby the input signal serves to charge the capacitor. The capacitor 140 is connected by a lead 142 to a buffer amplifier 144 which in turn is connected through a resistance 146 and a lead 148 to the output terminal indicated at "3." As previously explained, the output terminal "3" leads to the meter circuit 120 of FIG. 3. Consequently, it will be understood that the charge on the capacitor 140 produces a reading on the DC readout meter, and that such reading will thereafter be permitted to diminish at a rate which depends upon the rate of discharge of the capacitor 140.

In order to control the rate of discharge of the capacitor 140, there is connected in the discharge path a variable resistor 150. Inasmuch as the diode 136 is in essence a unidirectional conductor, the rate of discharge of the capacitor 140 can be controlled by either varying the capacitor itself or by varying the resistance 150, and in the embodiment being described such control is effected by varying the resistance 150. In other words, once a signal over the output lead 148 has produced a reading on the meter 106, the rate at which such a reading can decay or diminish is controlled by varying the resistor 150, and through such adjustment the rate of decay may be severely limited. On the other hand, if a further input signal of greater magnitude is conducted through the diode 136 so as to increase the charge on the capacitor, the increased input signal will be conducted over lead 148 to the meter circuit without any appreciable delay.

It is important to understand from the foregoing that in accordance with the present invention the response rate of the circuit may be controlled so that the gaging system will have a very rapid response for a change in the magnitude of the signal in one direction and a relatively slow response to a change of the magnitude of signal in the opposite direction. In other words, the system will provide a rapid response to a signal change in one direction, i.e., a signal of increased magnitude, but will provide a slower response to a signal change in the opposite direction, i.e., a signal of lesser magnitude, the reason being that the system can only respond to a lesser signal in accordance with the rate of discharge of the capacitor 140. It is also important to understand that the ratio of the two response rates can be varied substantially by varying the foregoing discharge rate, as for example by varying the resistor 150. As an illustration, the delay circuit may be designed so that the ratio is adjustable between 1 and 300, means that by adjusting the decay rate to one extreme the two response rates may be made equal, and by adjusting the system to the other extreme the rate of response to an increase in the magnitude of the signal may be made 300 times as fast as the rate of response to a decrease in the magnitude of the signal.

It should also be noted in connection with the present invention that, depending upon the application to which my improved gage system is put, it is a simple matter to alter the system so that it will have a rapid response in a preselected direction and a slow adjustable response in the opposite direction. For example, in an application as described in conjunction with FIG. 1, it will normally be desirable to connect the delay circuit 126 so that the system will respond very rapidly to any decrease in the thickness of the sheet stock S but will respond at a slower rate to an apparent increase in such thickness.

On the other hand, in certain applications, as for example in connection with the grinding of external surfaces having gaps or interruptions therein, it is necessary to utilize a gaging system which is capable of ignoring the surface interruptions. In an application of the latter type, the system would be connected so as to afford a very rapid response to a reading which corresponds to a maximum dimension of the part, i.e., a rapid response to any increase in the part size, while on the other hand when a gap or interruption in the external surface of the part produces a signal change in the opposite direction, it is desirable to afford a very slow response rate to the resultant signal change, thereby in effect ignoring such surface interruptions. Accordingly, it is significant to note that by simply reversing the polarity of the voltage input to the delay circuit 126, and at the same time reversing the readout meter 106, it is possible to reverse the gaging system and thereby preselect the type of signal change which is to receive a fast response and the type of signal change which is to receive a slow response.

Referring again to the particular strip stock gage fixture shown in FIG. 1, it will be assumed that the delay circuit 126 is connected so that the system will respond very rapidly to any decrease in the thickness of the sheet stock S but will respond slowly to an apparent increase in the thickness of the sheet. Consequently, if due to bouncing or weaving or vibration of the sheet S, or due to contamination of the sheet, the spacing between the crowned rollers 30 and 38 is temporarily increased, even though the true thickness of the sheet has not increased, the gage system of the present invention will ignore such false high readings. In other words, the meter 106 will not indicate such high readings but will continue to indicate what in effect is a reading of the minimum thickness of the part.

Thus, in the particular example described above, the gaging device of the present invention can be utilized to read the minimum thickness of a part while ignoring all false high readings which would be reflected as an increase in thickness by a conventional gage system. On the other hand, it will be understood that while the particular system being described in the foregoing example has a slow response rate to an apparent increase in the thickness of the sheet S, such slow response rate can be adjusted so that the system will respond to a true increase in the thickness of the sheet. Such selectivity can be achieved for the reason that a true increase in the thickness of the sheet will occur in a gradual manner or will be maintained over a period of time sufficient to allow the system to respond thereto. In other words, even the slowest of the two response rates of my gaging system must be as fast as any true change in the dimension of the work caused by a change in the process of producing the same.

Referring again to FIGS. 1 and 2, there is shown an alignment bar 152. The bar 152 is generally vertically disposed and its upper end projects into an aperture formed in the swivel block 72, while the lower end of the bar extends through an aperture formed in the swivel block 84. The alignment bar 152 is fixed relative to the swivel block 72 by means of a setscrew 154, whereas the bar is capable of sliding movement in the lower swivel block 84. The purpose of the alignment bar 152 in combination with the swivel blocks 72 and 84 is to maintain the micrometer anvil 76 in alignment with the gage head 88. Thus, in the particular gage fixture shown in FIG. 1, a vertical displacement of the sheet, e.g., an upward movement thereof, will cause the roller 30 to be displaced upwardly, thereby producing a pivotal movement of the arm 70 about the axis of the bar 20.

If the foregoing movement were substantial, the resulting pivotal movement of the micrometer anvil 76 would produce a situation where the micrometer anvil 76 would no longer be coaxial with the gage head 88. In accordance with the present invention, the micrometer anvil 76 is capable of pivotal movement about a horizontal axis along with the swivel block 72, while the gage head 88 is capable of pivotal movement about a horizontal axis along with the swivel block 84. Consequently, regardless of the positions to which the rollers 30 and 38 are moved, the alignment bar 152 will maintain the micrometer anvil 76 in coaxial relation with the gage head 88, thereby assuring proper contact between the anvil tip 94 and the tip of the plunger 98.

FIG. 2 further shows a bar 156 which extends upwardly from the swivel block 84, and a rod 158 which is threaded through the swivel block 72 and projects downwardly therefrom. The bar 156 is fixed relative to the block 84, while the rod 158 may be vertically adjusted relative to the block 72 and locked in a given position by means of a nut 160. The bar 156 and rod 158 function as stop members so as to limit the amount by which the anvil member 94 can force the plunger 98 into the gage head 88. In this manner, the gage head is protected against application of excessive force.

As has been explained hereinabove, the preferred embodiment of the present invention includes means for varying the ratio of the response rate to a signal change in one direction to the response rate to a signal change in the opposite direction, and in the particular embodiment described such means comprises the variable resistor 150. The advantage in being able to vary the ratio of the response rates is to permit adaption of the gage system for optimum use with various manufacturing processes. The desired ratio will vary depending upon the rate of true dimensional change of the work likely to occur in accordance with a particular manufacturing process.

In general, the rate of response in one direction will always be quite rapid, and in many applications it is not essential that this rate of response be adjustable. The slower rate of response in the opposite direction is adjustable and is preferably made as rapid as is possible without introducing errors into the readings. Accordingly, when setting up my gage system for operation, an appropriate procedure is to begin with a maximum response ratio setting, i.e., a rapid response in one direction and a very slow response in the opposite direction, and then test the operation of the gaging device by reducing the response ratio until a point is reached where the readings indicate an improper shift toward the plus side. In other words, assuming that the object is to read a minimum thickness of the work and to ignore false high readings, the response ratio is gradually reduced until there are indications that improper high readings are being produced, as for example by contamination of the work or vibration thereof, at which point the response ratio is set high enough to eliminate all such false high readings.

There are many applications for the present invention of the type described hereinabove where the object is to read a minimum thickness or other dimension of the work and ignore higher readings unless the higher readings occur gradually or are maintained over a period of time sufficient to indicate that they are true dimensional changes in the work resulting from the manufacturing process and not from contamination or from an inability to hold the work steady during the gaging thereof. However, there are other applications where as previously mentioned the gaging device may be connected so as to read a maximum dimension such as the outer diameter of a part while ignoring lesser readings unless such lesser readings occur gradually or are maintained for a time sufficient to indicate that they represent true dimensional changes in the work.

An example of an application of the latter type is in connection with the grinding of external surfaces having interruptions or gaps therein, such as elliptical pistons, splined shafts, etc. In such cases, the present invention may be used to gage a maximum dimension such as the outer diameter of the part, while ignoring the gaps or interruptions, i.e., the readings on the readout meter will not reflect the gaps or interruptions. Another example is where a plurality of parts in spaced relation are fed seriatim past a gage, in which case a gage may be used in accordance with the present invention which will in effect ignore the spaces between the parts.

The present invention may be used with various types of gage heads, and in fact may be used in conjunction with virtually any gaging system which produces an electrical output signal. For example, it may be used not only with gages having a plunger which contacts the work, or having a plunger which is connected mechanically to a sensing member which contacts the work, but it may also be used with various types of electrical air gages including noncontact air gages.

The present invention permits the use of gaging techniques which would otherwise be impossible in many situations. For example, the strip stock gage fixture 10 shown in FIG. 1 would simply not be practical and would not produce accurate results without the use of a delay circuit in accordance with the present invention. In any such application where it is not possible to keep the work steady as it passes the gage, or in any situation where it is not possible to avoid contamination of the work being gage, accurate results are possible only by virtue of the improvements produced by the present invention. In other words, the conventional procedure for measuring the thickness of sheet stock such as shown at S in FIG. 1 is to periodically stop the sheet and manually use a micrometer to check the edge portions of the sheet.

Moreover, I have found that many existing gage systems can easily be converted for operation in accordance with the present invention so as to produce greatly increased accuracy without the necessity of completely rebuilding such systems. In other words, many such existing gage devices can be converted by simply modifying the amplifier circuit to add a delay feature in accordance with the principles of the present invention.

I claim:

1. A gaging device for gaging a dimension of work to be checked while the latter is in motion, comprising, in combination, sensing means past which the work is moved, electrical means responsive to said sensing means for producing an electrical signal which varies in accordance with the dimension of the work as sensed by said sensing means, readout means for displaying a reading which is indicative of the dimension of the work, said readout means being controlled by said electrical means, and amplifier means interposed between said electrical means and said readout means for receiving electrical signals from said electrical means and controlling the input to said readout means, said amplifier means having two response rates to electrical signals supplied thereto, there being one response rate to a signal change which indicates an increase in the dimension of the work and a second response rate to a signal change which indicates a decrease in the dimension of the work, said two response rates being substantially different from one another.

2. The device of claim 1 including means for varying at least one of the two response rates.

3. The device of claim 1 where the response rate to a signal change which indicates an increase in the dimension of the work is very slow in comparison to the response rate to a signal change which indicates a decrease in the dimension of the work whereby said device will tend to read a minimum dimension of the work while ignoring apparent increases in such dimension unless the increase occurs gradually or is maintained for a time sufficient for the slowest of the two response rates to respond thereto.

4. The device of claim 1 where the response rate to a signal change which indicates a decrease in the dimension of the work is very slow in comparison to the response rate to a signal change which indicates an increase in the dimension of the work whereby said device will tend to read a maximum dimension of the work while ignoring apparent decreases in such dimension unless the decrease occurs gradually or is maintained for a time sufficient for the slowest of the two response rates to respond thereto.

5. The device of claim 2 where said means for varying at least one of the two response rates permits adjustment of the ratio of the faster response rate to the slower response rate to a ratio factor of at least 100 to 1.

6. The device of claim 1 where said amplifier means includes a readout meter and where an electrical delay circuit is interposed prior to said readout meter for delaying a change in the meter reading in one direction while permitting a substantially more rapid change in the meter reading in the opposite direction.

7. The device of claim 6 where said delay circuit includes capacitor means which is charged when a signal is supplied to said meter and which is connected with said meter to temporarily delay change in a meter reading in one direction while permitting a more rapid change in the opposite direction, and means for adjusting the rate of discharge of said capacitor means in order to control the magnitude of said delay and thereby control the rate of response of said device to a signal change in said one direction.

8. The device of claim 7 including variable resistor means for controlling the rate of discharge of said capacitor means.